UNITED STATES PATENT OFFICE.

RUDOLF PLATZ, OF LEIPSIC, GERMANY.

COMPOSITION OF MATTER FOR MOLDING PURPOSES.

SPECIFICATION forming part of Letters Patent No. 629,600, dated July 25, 1899.

Application filed March 2, 1899. Serial No. 707,521. (No specimens.)

*To all whom it may concern:*

Be it known that I, RUDOLF PLATZ, a subject of the Emperor of Germany, residing at 6$^b$ Zeitzerstrasse, Leipsic, Empire of Germany, have invented a new and useful Composition of Matter to be Used for Molding Purposes, of which the following is a description.

My composition or compound for molding purposes consists of the following essential ingredients, to which, if desirable, coloring-matter may be added: water-glass, pulverized chalk, and sawdust. The ingredients are to be thoroughly mingled by agitation and then form a viscid mass, which can easily be brought into the desired shape. The mass soon will become of stone-like hardness and appearance. The hardened mass is fireproof, waterproof to a certain degree, a very bad conductor of heat, and, in spite of its stone-like hardness, of relatively low specific gravity. The hardened molding can be sawed, filed, bored, and polished. Nails can also be driven into it without cracking or otherwise injuring it.

Although a liberal range of the proportions of the various constituents making up the compound may be allowed, the following proportions have been found to give the best result: seventeen parts of sawdust, twenty-seven parts of chalk, and fifty-six parts of water-glass. To this viscid mass any suitable coloring matter or matters may be added, according to the color the finished product is to have. The mass is now brought into the desired shape and given a preliminary hardening and is then exposed to the free air for about forty-eight hours, when the molding is ready to undergo the various finishing processes. The roughly-molded hardened article may be polished and lacquered. A few of the articles to be made out of this mass may here be enumerated: building-blocks for children to build miniature houses with, plinths, pillars, isolating-walls, floor and ceiling coverings, picture-frames, and fancy articles, such as inkstands, clock-cases, trays, and the like. The articles are almost indestructible.

What I do claim, and desire to secure by Letters Patent, is—

1. The herein-described compound, consisting of sawdust, water-glass and pulverized chalk, mixed in about the proportions set forth.

2. The herein-described compound, consisting of sawdust, seventeen parts; pulverized chalk, twenty-seven parts; and water-glass, fifty-six parts, substantially as and for the purposes set forth.

In testimony whereof I affix my signature in presence of two witnesses.

RUDOLF PLATZ.

Witnesses:
RUDOLPH FRICKE,
B. H. WARNER, Jr.